(12) United States Patent
Sanin et al.

(10) Patent No.: US 7,107,447 B2
(45) Date of Patent: Sep. 12, 2006

(54) USE OF PSEUDONYMS VS. REAL NAMES

(75) Inventors: Aleksey Sanin, Sunnyvale, CA (US);
Conor P. Cahill, Waterford, VA (US)

(73) Assignee: America Online, Inc., Dulles, VA (US)

( * ) Notice: Subject to any disclaimer, the term of this patent is extended or adjusted under 35 U.S.C. 154(b) by 106 days.

(21) Appl. No.: 10/418,904

(22) Filed: Apr. 17, 2003

(65) Prior Publication Data
US 2004/0210770 A1    Oct. 21, 2004

(51) Int. Cl.
*H04L 9/00*    (2006.01)
(52) U.S. Cl. .................. 713/170; 713/180; 713/182
(58) Field of Classification Search ............... 713/170, 713/180, 182, 200–201; 709/223–229
See application file for complete search history.

(56) References Cited

U.S. PATENT DOCUMENTS

| | | | |
|---|---|---|---|
| 5,245,656 A | 9/1993 | Loeb et al. ................... 380/23 |
| 5,521,980 A | 5/1996 | Brands ......................... 380/30 |
| 5,604,805 A | 2/1997 | Brands ......................... 380/30 |
| 5,682,430 A | 10/1997 | Kilian et al. .................. 380/30 |
| 5,754,938 A | 5/1998 | Herz et al. ................... 455/4.2 |
| 5,864,667 A | 1/1999 | Barkan .................. 395/187.01 |
| 5,884,270 A * | 3/1999 | Walker et al. .................. 705/1 |
| 5,884,272 A | 3/1999 | Walker et al. .................. 705/1 |
| 6,014,646 A * | 1/2000 | Vallee et al. ................... 705/39 |
| 6,061,789 A | 5/2000 | Hauser et al. ............... 713/168 |
| 6,064,878 A | 5/2000 | Denker et al. ............... 455/415 |
| 6,076,078 A | 6/2000 | Camp et al. ................... 705/65 |
| 6,161,129 A * | 12/2000 | Rochkind ................... 709/206 |
| 6,253,203 B1 | 6/2001 | O'Flaherty et al. ............. 707/9 |
| 6,275,824 B1 | 8/2001 | O'Flaherty et al. ............. 707/9 |
| 6,385,725 B1 | 5/2002 | Baum-Waidner ........... 713/175 |
| 6,415,270 B1 * | 7/2002 | Rackson et al. ............... 705/37 |
| 6,438,691 B1 * | 8/2002 | Mao ........................... 713/176 |
| 6,571,279 B1 * | 5/2003 | Herz et al. ................... 709/217 |
| 6,717,938 B1 * | 4/2004 | D'Angelo .................... 370/352 |
| 6,748,366 B1 * | 6/2004 | Hurwitz et al. ................ 705/53 |
| 6,789,191 B1 * | 9/2004 | Lapstun et al. ............. 713/168 |
| 6,889,325 B1 * | 5/2005 | Sipman et al. .............. 713/176 |
| 6,952,769 B1 * | 10/2005 | Dubey et al. ................ 713/153 |

FOREIGN PATENT DOCUMENTS

| | | |
|---|---|---|
| EP | 773 647 | 5/1997 |
| EP | 858 021 | 8/1998 |
| EP | 946 022 | 9/1999 |
| EP | 991 005 | 4/2000 |

(Continued)

OTHER PUBLICATIONS

Dillich, Oct. 8, 1999, Surf the Web with Greater Freedom, vol. 15, iss. 38; p. 20.*

(Continued)

*Primary Examiner*—Thomas R. Peeso
(74) *Attorney, Agent, or Firm*—Michael A. Glenn; Glenn Patent Group

(57) ABSTRACT

An apparatus and method is provided for allowing users to share services without sharing identities. Specifically, the apparatus and method allow users to share pseudonyms instead of actual user names, thus protecting both users from unwanted emails, IM messages, and the like. The invention provides an introduction scheme, which comprises a simple and secure way of establishing a user to user link. A preferred embodiment incorporates services of a linked federation network service, such as AOL's Liberty Alliance service, without exposing real user names to other users.

39 Claims, 1 Drawing Sheet

FOREIGN PATENT DOCUMENTS

| EP | 992 924 | 4/2000 |
|----|---------|--------|
| EP | 876 722 | 4/2002 |

OTHER PUBLICATIONS

Inside the Internet. Louisville: Apr. 2000, vol. 7, iss. 4; p. 1-4.*
The Computer Lawyer. Englewood Cliffs, Jul. 2000, vol. 17, iss. 7; p. 23.*
Tygar, 1996, Computer Science Department Carnegie Mellon University, p. 8-26.*
Kaashoek, 1998, MIT Laboratory for Computer Science, p. 27-36.*
*Informational Self-Determination By Identity Management*; Kohntopp, M.; Pfitzmann, A.; IT+TI Informationstechnik und Technische Informatik; Sep. 2001.
*Identity Management And Its Support Of Multilateral Security*; Clauss, S.; Kohntopp, M.; Computer Networks; Oct. 2001.
*Secure Anonymous Signature-Based Transactions*; Van Herreweghen, E.; Computer Security; 6th European Symposium on Research in Computer Security; 2000.
*On Secure And Pseudonymous Client-Relationships With Multiple Servers*; Bleichenbacher, D.; Gabber, E.; Gibbons, P.B.; Matias, Y.; Mayer, A.; Proceedings of the 3rd USENIX Workshop on Electronic Commerce; 1998.
*Tarzan: A Peer-to-Peer Anonymizing Network Layer*; M. Freedman, R. Morris; CCS'02, Nov. 18-22, 2002.
*Pseudonym Systems*; A. Lysyanskaya, R. Rivest, A. Sahai; MIT Laboratory for Computer Science; Jun. 1999.
*On Pseudonymization Of Audit Data For Intrusion Detection*; Biskup, J.; Flegel, U.; Designing Privacy Enhancing Technologies. International Workshop on Design Issues in Anonymity and Unobservability. Proceedings; 2001.
*Identity Management Based on P3P*; Berthold, O.; Kohntopp, M.; Designing Privacy Enhancing Technologies. International Workshop on Design Issues in Anonymity and Unobservability. Proceedings; 2001.
*Can Pseudonymity Really Guarantee Privacy?*; Rao, J.R.; Rohatgi, P.; Proceedings of the Ninth USENIX Security Symposium; 2000.
*Distributed Temporary Pseudonyms: A New Approach For Protecting Location Information In Mobile Communication Networks*; Kesdogan, D.; Reichl, P.; Junghartchen, K.; Computer Security—ESORICS 98. 5th European Symposium on Research in Computer Security. Proceedings; 1998.
*Anonymity, Pseudonymity, Or Inescapable Identity On The Net*; Johnson, D.G.; Miller, K.; Computers & Society; Jun. 1998.
*Protecting Free Expression Online with Freenet*; I. Clarke, T. Hong, S. Miller, O. Sandberg, B. Wiley; www.freenetproject.org.
*PAST: A Large-Scale, Persistent Peer-to-Peer Storage Utility*; P. Druschel, A. Rowstron, Microsoft Research Ltd.
*The Social Cost of Cheap Pseudonyms*; E. Friedman, Department of Economics, Rutgers University; P. Resnick, University of Michigan School of Information; Aug. 2000.
*How to Make Personalized Web Browsing Simple, Secure, and Anonymous*; E. Gabber, P. Gibbons, Y. Matias, A. Mayer; Bell Laboratories, Lucent Technologies; eran,gibbons,matias,alain@research.bell-labs.com.
*Privacy-Enhancing Technologies for the Internet*; I. Goldberg, D. Wagner, E. Brewer; UC Berkeley; iang,daw,brewer@cs.berkeley.edu.
*Unlinkable Serial Transactions*; P. Syverson, S. Stubblebine, D. Goldschlag; Financial Cryptography '97; Spring-Verlag LLNCS, 1997.

\* cited by examiner

USE OF PSEUDONYMS VS. REAL NAMES

BACKGROUND OF THE INVENTION

1. Technical Field

The invention relates generally to user identification. More particularly, the invention relates to allowing users to share pseudonyms instead of actual user names to protect the user's privacy and from unwanted emails, instant messages, etc.

2. Description of the Prior Art

In the modern Internet, accessibility to any real user name made public may compromise the user's privacy as well as open the user to unsolicited spam email, instant messages, etc. Because of this, it is very important to protect user identification. This is especially important in the environment of a federation network of Web services and its participants.

The problem of protecting a user's identify exists in both the user-to-service scenario and the user-to-user scenario. It should be appreciated that it is particularly difficult to protect user identity in the user-to-user case. For example, how can user Alice give user Bob access to Alice's Calendar service and at the same time protect both Alice's and Bob's identity from each other? Similarly, how can Alice establish a chat session with Bob without knowledge of Bob's real user name?

Loeb, Shoshana K. and Yacobi, Yacov, Security Method for Private Information Delivery and Filtering in Public Networks, U.S. Pat. No. 5,245,656 (Sep. 14, 1993) teach a technique that protects end-user privacy by insuring that no logical entity is aware of the end-user identity and also aware of the end-user profile and content of the information the end-user receives. A method for operating customized information services via a network comprising transmitting the identity U of an end-user station via the network to a name translator station. At the name translator station, the identity U of the end-user station is translated into a pseudonym U'. The pseudonym U' is transmitted from the name translator station via the network to a filter station. The pseudonym U' is transmitted from the filter station via the network to a service provider station. In response, the service provider station transmits to the filter station an encrypted information description describing information available from the service provider station. At the filter station, the encrypted information description is compared with an encrypted information profile of the end-user station to identify specific information to be transmitted from the service provider station to the end-user station. An indicator is then transmitted from the filter station to the service provider station indicating the specific information to be transmitted to the end-user station. The specific information is then transmitted via the name translator station to the end-user station in an encrypted form not accessible to the name translator station. The specific information is decrypted at the end-user station. Such teaching provides a rather complex workaround for protecting user identity.

Brands, Stefanus A., Privacy-Protected Transfer Of Electronic Information, U.S. Pat. No. 5,521,980 (May 28, 1996) and U.S. Pat. No. 5,604,805 (Feb. 18, 1997) teaches a cryptographic apparatus and means for each of three types of participants in an electronic system for privacy-protected transfer of certified information. Such disclosure reveals protocols for improving efficiency and security in such systems, and allows a variety of useful extensions in functionality without difficulty. This is achieved by a restrictive blind signature protocol in combination with a testing protocol. The restrictive blind signature protocol allows the certifying party to encode data into certified information that it provides to a receiving party, such that it cannot be altered or modified by the receiving party. The testing protocol enables parties to prove a variety of characteristics about the encoded data in their certified information.

Jay S. Walker, Bruce Schneier, and T. Scott Case, Method and System for Facilitating an Employment Search Incorporating User-Controlled Anonymous Communications, U.S. Pat. No. 5,884,270 (Mar. 16, 1999) and Method and System for Establishing and Maintaining User-Controlled Anonymous Communications, U.S. Pat. No. 5,884,272 (Mar. 16, 1999), teach a method and system for operating a computer system to facilitate an exchange of identities between two anonymous parties. The method and system are operative to receive from a first party first data including an identity of the first party and to receive from the first party at least two first-party rules for releasing the first data including a rule for releasing the identity of said first party. The system and method are further operative to receive from a second party a search request comprising at least one search criterion; receive from the second party second data including an identity of the second party; and receive from the second party at least two second-party rules for releasing the second party data including a rule for releasing the identity of the second party. The system and method are further operative to process said search request to determine if the first data satisfies the search criterion and if so, then exchanging the first and second data, except the identities of the first and second parties, between the first and second parties in accordance with the first-party and second-party rules. The system and method are further operative to transmit the identity of the first party to the second party after the exchanging step, upon satisfying the first-party rule for releasing the identity of the first party, and after the exchanging step, upon satisfying the second-party rule for releasing the identity of the second party, transmitting the identity of the second party to the first party.

Ralf Ch. Hauser and Gene Tsudik, Secure Anonymous Information Exchange in a Network, U.S. Pat. No. 6,061,789 (May 9, 2000) teaches that computer network management for electronic commerce requires technical implementations of business processes. The process addressed in the disclosure is a technical method for a communication in which two or more parties legitimately want to communicate anonymously, often before discussing a deal or closing a business, e.g. for anonymous bidding or auctioning in electronic commerce. Essentially, the method is described by a protocol, for safely exchanging data in a network that provides a public key infrastructure and an anonymous communication possibility between network users. It consists of a sequence of steps in which both sender (e.g. customer) and addressee (e.g. merchant) compose data sets (i.e., requests and replies) that are based on received data and/or prior knowledge. The data sets are enciphered to provide anonymity, and digitally signed to provide proof of the partner.

Ichikawa Haruhisa, Hisada Yusuke, and Ono Satoshi, Email Access Control Scheme for Communication Network Using Identification Concealment Mechanism, European Patent Number EP946022 (Sep. 9, 1999) teaches an email access control scheme capable of resolving problems of the real email address and enabling a unique identification of the identity of the user while concealing the user identification. A personalized access ticket containing a sender's identification and a recipient's identification in correspondence is to be presented by a sender who wishes to send an email to a recipient so as to specify the recipient as an intended destination of the email. Also taught are accesses between the sender and the recipient by verifying an access right of the sender with respect to the recipient according to the personalized access ticket at a secure communication service. Also, an official identification of each user by which each user is uniquely identifiable by a certification authority, and an anonymous identification of each user containing at least one fragment of the official identification are defined, and each user is identified by the anonymous identification of each user in communications for emails on a communication network.

Kohntopp, M. and Pfitzmann, A., *Informational Self-Determination By Identity Management*, IT+TI Informationstechnik und Technische Informatik (September 2001) teach an identity management system that enables the user to control the nature and amount of personal information released. Thus, it is an important building block for implementing both privacy protection and multilateral security. Described are requirements and solutions for a comprehensive, privacy enhancing identity management system, which is based on pseudonyms and includes the possible cooperation of all parties, involved. Finally, limitations and risks of such systems are discussed.

Clauss, S. and Kohntopp, M, *Identity Management And Its Support Of Multilateral Security*, Computer Networks (October 2001) describe an approach in developing an identity management system with respect to multilateral security. After examining digital pseudonyms and credentials as basic concepts of such a system, an introduction to technologies for multilateral security is given and an architecture which enables multilaterally secure communication is described. By means of different scenarios, requirements of an identity management system is shown, and an approach in developing an identity manager and its infrastructure is outlines. Finally, problems and risks of identity management systems which must be considered when using such a system are discussed.

Van Herreweghen, E., *Secure Anonymous Signature-Based Transactions,* Computer Security, 6th European Symposium on Research in Computer Security (2000) teaches that electronic commerce protocols often require users to reveal their identities and other information not necessary for reasons of security and that some applications such as contract signing are often argued to require a signer's authenticated identity; but this authentication may give the recipient a false feeling of security if certificate registration procedures do not guarantee a mapping to a liable person, or correctness of certificate data. A separation of identity from liability is proposed. Liability-aware certificates allow certificate issuers to make explicit which liabilities it takes with respect to the transaction, the certificate data or the signer's identity. Their use is illustrated in the design of a pseudonym service providing pseudonym certificates for secure anonymous transactions.

Bleichenbacher, D., Gabber, E., Gibbons, P. B., Matias, Y., and Mayer, A., *On Secure And Pseudonymous Client-Relationships With Multiple Servers,* Proceedings of the 3rd USENIX Workshop on Electronic Commerce (1998) introduces a cryptographic engine, Janus, that assists clients in establishing and maintaining secure and pseudonymous relationships with multiple servers. The setting is such that clients reside on a particular subnet (e.g. corporate intranet, ISP) and the servers reside anywhere on the Internet. The Janus engine allows for each client-server relationship to use either weak or strong authentication on each interaction. At the same time, each interaction preserves privacy by neither revealing a client's true identity ("modulo" the subnet) nor the set of servers with which a particular client interacts. Furthermore, clients do not need any secure long term memory, enabling scalability and mobility. The interaction model extends to allow servers to send data back to clients via e-mail at a later date. Hence, results complement the functionality of current network anonymity tools and remailers.

M. Freedman and R. Morris, *Tarzan: A Peer-to-Peer Anonymizing Network Layer*, CCS'02 (Nov. 18–22, 2002) teaches a peer-to-peer anonymous IP network overlay, and that apparently achieves its anonymity with layered encryption and multi-hop routing. The abstract states that Tarzan provides anonymity to either clients or servers, without requiring that both participate. It continues to state that in both cases, Tarzan uses a network address translator (NAT) to bridge between Tarzan hosts and oblivious Internet hosts.

A. Lysyanskaya, R. Rivest, and A. Sahai, *Pseudonym Systems,* MIT Laboratory for Computer Science (June 1999) discloses pseudonym systems which allow users to interact with multiple organizations anonymously using pseudonyms. The disclosure states that previous work in this area did not protect the system against dishonest users who collectively use their pseudonyms and credentials, i.e. share an identity, and that previous practical schemes also relied very heavily on the involvement of a trusted center. The disclosure further gives a formal definition of pseudonym systems where users are motivated not to share their identity, and in which the trusted center's involvement is minimal, and gives theoretical constructions for such systems based on any one-way function and presents a practical scheme.

It would be advantageous to provide and allow user-to-user and user-to-network services communication without compromising user identity. More specifically, it would be advantageous to provide an introduction scheme that provides a simple and secure way of establishing a user-to-user link, for example, on a federation network of Web services, without exposing real user names to other users' names or Web services, for example, by way of a pseudonym.

SUMMARY OF THE INVENTION

An apparatus and method is provided for allowing users to share services without sharing identities. Specifically, the apparatus and method allow users to share pseudonyms instead of actual user names, thus protecting both users from unwanted emails, IM messages, and the like. The invention provides an introduction scheme, which comprises a simple and secure way of establishing a user to user link. A preferred embodiment incorporates services of a linked federation network service, such as AOL's Liberty Alliance service, without exposing real user names to other users.

DETAILED DESCRIPTION OF THE INVENTION

Figure 1:
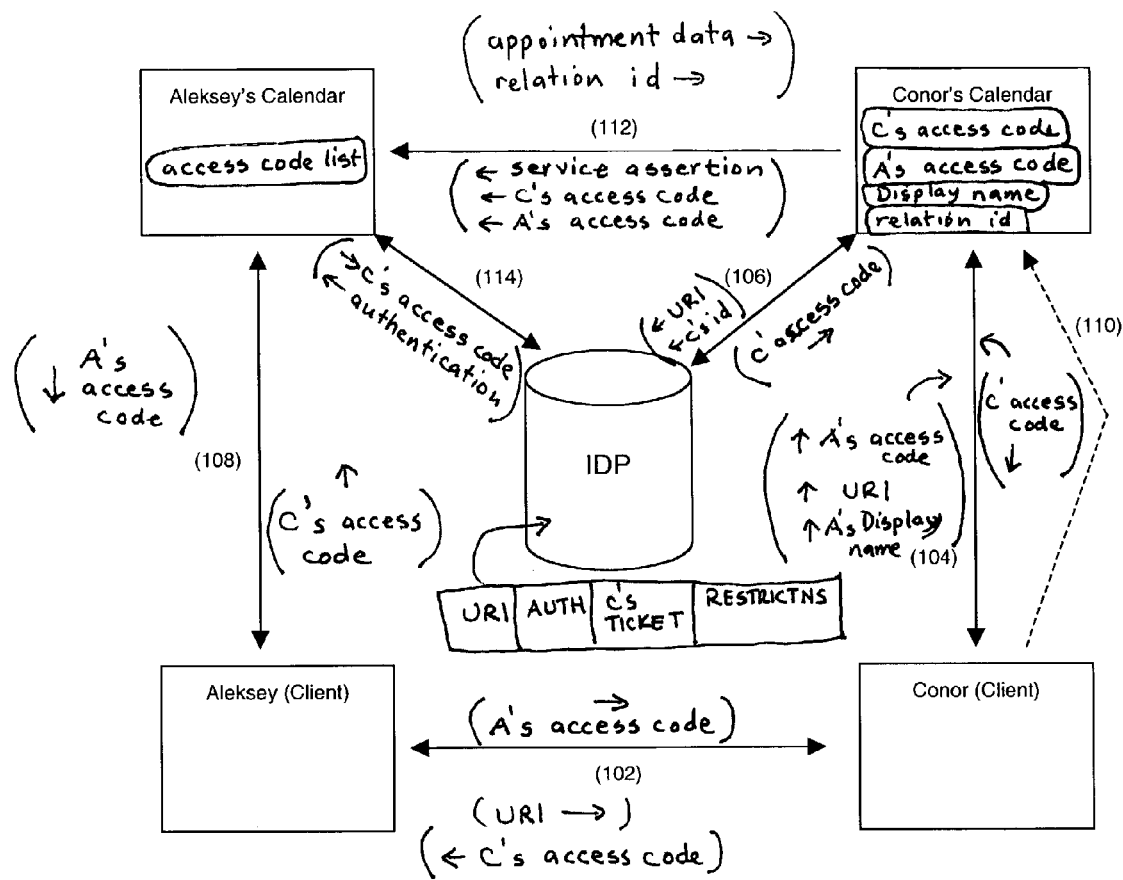
FIG. 1 is a schematic diagram showing the main components in an example situation and how the components are related to one another according to the invention.

An apparatus and method is provided for allowing users to share services without sharing identities. Specifically, the apparatus and method allow users to share pseudonyms instead of actual user names, thus protecting both users from unwanted emails, IM messages, and the like. The invention provides an introduction scheme, which comprises a simple and secure way of establishing a user to user link. A preferred embodiment incorporates services of a linked federation network service, such as AOL's Liberty Alliance service, without exposing real user names to other users.

The preferred embodiment of the invention can be described with reference to FIG. 1. FIG. 1 is a schematic diagram showing the main components of the invention in an example situation and how the components are related to one another. In this example, the goal is for a user, for simplicity named Aleksey, to give another user, for simplicity named Conor, access to one of Aleksey's services, which, in this example is the calendar service.

It should be appreciated that the calendar service is used by example only and that any other service or feature, such as, for example, an address book service or an instant messaging service, can be used in the invention.

Phase I: Setting up the Access Code

Suppose Aleksey wants to give Conor access to one of Aleksey's service, namely, the calendar service. First, Aleksey obtains Conor's access code and stores it in Aleksey's calendar service, as follows.

Aleksey provides the name of his calendar service, such as, for example, an associated URI, to Conor (102). At the same time, Aleksey makes a request to Aleksey's calendar for Aleksey's access code (108) and submits it to Conor (102). Conor then submits Aleksey's access code received from Aleksey along with Aleksey's calendar name, e.g. URI, to Conor's own calendar, which stores Aleksey's access code and the URI. At the same time, Conor also submits a display name to be used for Aleksey to Conor's calendar (104) for storage. Conor's calendar makes request to an authentication service for Conor, for example, Conor's identity provider service (IDP), for Conor's access code (106). Conor's IDP authenticates Conor's identity information, e.g. using login name and password. Then the IDP uses Conor's identity information as well as Aleksey's URI as input and generates an access code for Conor. It should be appreciated that the in the preferred embodiment of the invention, the authentication service comprises the functionality of generating and verifying access codes. Conor's access code is returned to Conor's calendar service, which stores Conor's returned access code and Aleksey's display name, and makes Conor's display name available, such as via a display, to Conor (104). Conor provides Conor's access code to Aleksey by phone, mail, IM, and the like (102). Finally, Aleksey provides Conor's access code to Aleksey's calendar, which then stores the access code, such as in an access code list.

In the preferred embodiment of the invention, the IDP, which generates the access code, stores Aleksey's URI, Conor's identity information, Conor's access code, and any additional and related informational data in a table format.

It should be appreciated that the IDP doesn't have to perform the verification process itself, but can send the data to another entity, such as a third party vendor, to perform the authentication service.

It should be appreciated that access codes are typically generated once, are generated in a random fashion, and do not comprise any personal information of users, i.e. they don't disclose the identity of the user in question. For example, in one embodiment the access code, or ticket, is a random number. Such random information is known only to the authentication service, such as in this example, Conor's IDP.

It should be appreciated that the access code comprises two important data: Aleksey's URI and Conor's id. That is, it is logically bound to Conor and Aleksey's calendar service. Therefore, this access code would not work with any other type of service or with any one else except with Conor.

It should further be appreciated that the terms, access code, ticket, and pseudonym are used herein interchangeably.

Phase II: Using the Access Code

Suppose Conor wants to schedule an appointment with Aleksey. Conor can accomplish this task using the invention by having his calendar service schedule an appointment with Aleksey's calendar service. According to the preferred embodiment of the invention, Conor begins the process (110) by selecting Aleksey's display name previously stored in Conor's calendar service in step 104. Conor's calendar service submits a service assertion (a logical assertion requesting a particular service) along with both Conor's access code and Aleksey's access code to Aleksey's calendar service (112). Aleksey's calendar service requests whether or not Conor's access code, Conor's identity information and service assertion are verified in Conor's IDP (114) If verified, authentication information of Conor along with Conor's ticket, or access code, is sent to Aleksey's calendar (114). Also, if verified, then Conor's calendar service is "federated" with Aleksey's calendar service.

Aleksey's calendar service looks up Conor's access code in the access codes list, establishes a relation and a relation identification (relation id) between Aleksey's account and Conor's account in Conor's calendar. Aleksey's calendar service returns to Conor's calendar the "relation id" and the requested appointment information data. Conor's calendar service stores the returned "relation id". After this, Aleksey's calendar and Conor's calendar have established a trusted relationship and can use any existing protocols to actually exchange informational data, such as schedule appointments, etc.

It should be appreciated in the preferred embodiment of the invention, an access code is unique across all IDPs and short enough so that it can be typed. An example of an access code follows:

<unique IDP code><unique ID inside IDP>.

It should be further appreciated that once Aleksey's calendar service verifies Conor's access code, then Aleksey's calendar service and Conor's calendar service can communicate in any way desired and possible.

It should further be appreciated that part of the verification process provides additional data, such as restrictions, to the Aleksey's access code. For example, Conner might only be allowed to schedule meetings on weekdays, not on weekends. These restrictions are set by Aleksey when he creates Aleksey's access code for Conor (the very first step).

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. An apparatus for sharing services without sharing identity informational data using pseudonyms, said apparatus comprising:

a first service associated with a first identity informational data and associated with a first pseudonym;

a second service associated with a second identity informational data and associated with a second pseudonym, wherein said second service desires to interact with said first service; and an authentication mechanism for authenticating said second identity informational data for sharing of said first and second services, wherein at least one of said first service and said second service provides a Universal Resource Identity for an internet resource to said authentication mechanism.

2. The apparatus of claim 1, further comprising:

a second authentication mechanism for authenticating said first identity informational data for sharing of said first and second services;

wherein said first authentication mechanism and said second authentication mechanism are inside a circle of trust.

3. The apparatus of claim 2, wherein said first authentication mechanism and said second authentication mechanism are the same authentication mechanism.

4. The apparatus of claim 1, wherein said first service comprises:

a Universal Resource Identity (URI).

5. A method for sharing services without sharing identity informational data using pseudonyms, said method comprising the steps of:

providing a first service associated with a first identity informational data and associated with a first pseudonym;

providing a second service associated with a second identity informational data and associated with a second pseudonym, wherein said second service desires to interact with said first service; and providing an authentication mechanism for authenticating said second identity informational data for sharing of said first and second services, wherein at least one of said first service and said second service provides a Universal Resource Identity for an internet resource to said authentication mechanism.

6. The method of claim 5, further comprising the steps of:

providing a second authentication mechanism for authenticating said first identity informational data for sharing of said first and second services;

wherein said first authentication mechanism and said second authentication mechanism are inside a circle of trust.

7. The method of claim 6, wherein said first authentication mechanism and said second authentication mechanism are the same authentication mechanism.

8. The method of claim 5, wherein said first service comprises:

a Universal Resource Identity (URI).

9. A method for a first service having identity information to obtain informational data from a second service without said second service having access to said identity information, said method comprising the steps of:

said first service providing identity information of said first service and providing location information of said second service to an authentication service, said authentication service using said identity information and said location information of said second service for generating an associated access code for said first service; and said authentication service verifying said associated access code when said first service desires to use said second service.

10. The method of claim 9, wherein said second service comprises:

a Universal Resource Identity (URI).

11. The method of claim 9, further comprising the step of:

federating said first service and said second service upon completion of said step of verifying.

12. An apparatus for a first service having identity information to obtain informational data from a second service without said second service having access to said identity information, said apparatus comprising:

means for said first service providing identity information of said first service and providing location information of said second service to an authentication service, means for said authentication service using said identity information and said location information of said second service for generating an associated access code; and means for said authentication service verifying said associated access code when said first service desires to use said second service.

13. The method of claim 12, wherein said location information of said second service comprises:

a Universal Resource Identity (URI).

14. The apparatus of claim 12, wherein said either said first service or said second service comprises any of:

a calendar service;

an address book; and an instant messaging service.

15. The method of claim 12, further comprising the step of:

federating said first service and said second service upon successful completion of said step of verifying.

16. A method for a second service allowing access by a first service, said method comprising the steps of:

said second service obtaining an access code associated with said first service;

said second service storing said access code; and said second service requesting an authentication service to verify said access code, wherein said access code comprises location informational data of said first service and identity informational data of said second service, wherein said authentication service has both an identity of said first service and said access code associated with said first service.

17. The method of claim 16, wherein said authentication service uses a Universal Resource Identity (URI).

18. An apparatus for a second service allowing access by a first service, said method comprising:

means for said second service obtaining an access code associated with said first service;

means for said second service storing said access code; and means for said second service requesting an authentication service to verify said access code, wherein said access code comprises location informational data of said first service and identity informational data of said second service, wherein said either said first service or said second service comprises any of:

a calendar service;

an address book; and an instant messaging service.

19. The apparatus of claim 18, wherein said authentication service uses a Universal Resource Identity (URI).

20. A method for a second service allowing access by a first service for sharing relevant data, said method comprising the steps of:

said second service having a name and a user coupled to said second service providing said name of said second service to a user coupled to said first service;

said user coupled to said first service submitting said name and a display name coupled to said second service to said first service;

said first service making a request to an authentication service to generate an access code for said first service to access said second service, wherein said first service provides as input to said authentication service identity information coupled to said first user and said name;

said authentication service returning to said first service said access code;

said first service storing said returned access code, storing said display name, and making said display name available to said first user, said first user providing said access code to said second user;

said second user providing said access code to said second service for said second service to store said access code;

for using said second service, said user coupled to said first service selecting said display name stored on said first service;

said first service respondably submitting a service assertion, said first user identity information and said access code to said second service;

said second service requesting from said authentication service verification of said access code; and if verified, said authentication service providing authentication information to said second service, wherein said name is a Universal Resource Identity (URI).

21. The method of claim 20, wherein said step of providing said access code to said second user is by, but is not limited to, phone, mail, IM, and the like.

22. The method of claim 20, wherein said access code is stored on said second service in an access code list.

23. The method of claim 20, further comprising the step of: said authentication service storing said name, said identity information, said access code, and any additional and related informational data in a table format.

24. The method of claim 20, wherein said access code is a random number.

25. The method of claim 20, further comprising the steps of:

said second service establishing a relation and relation identification data between said second service and said guest account;

said second service sending said relation identification data to said first service along with said relevant data; and said first service storing said relation identification data for future use.

26. The method of claim 20, wherein said access code is formatted as:

<unique IDP code><unique ID inside IDP>.

27. The method of claim 20, wherein if said second service verifies said access code, then said second service and said first service can communicate in any way possible.

28. The method of claim 20, further comprising the step of said authentication service providing additional information relevant to said first service.

29. An apparatus for a second service allowing access by a first service for sharing relevant data, said apparatus comprising:

means for said second service having a name and a user coupled to said second service providing said name of said second service to a user coupled to said first service;

means for said user coupled to said first service submitting said name and a display name coupled to said second service to said first service;

means for said first service making a request to an authentication service to generate an access code for said first service to access said second service, wherein said first service provides as input to said authentication service identity information coupled to said first user and said name;

means for said authentication service returning to said first service said access code;

means for said first service storing said returned access code, storing said display name, and making said display name available to said first user;

means for said first user providing said access code to said second user;

means for said second user providing said access code to said second service for said second service to store said access code;

for using said second service, means for said user coupled to said first service selecting said display name stored on said first service;

means for said first service respondably submitting a service assertion, said first user identity information and said access code to said second service;

means for said second service requesting from said authentication service verification of said access code; and if verified, means for said authentication service providing authentication information to said second service, wherein said name is a Universal Resource Identity (URI).

30. The apparatus of claim 29, wherein said means for providing said access code to said second user is by, but is not limited to, phone, mail, IM, and the like.

31. The apparatus of claim 29, wherein said access code is stored on said second service in an access code list.

32. The apparatus of claim 29, further comprising means for said authentication service storing said name, said identity information, said access code, and any additional and related informational data in a table format.

33. The apparatus of claim 29, wherein said access code is a random number.

34. The apparatus of claim 29, further comprising:

means for said second service establishing a relation and relation identification data between said second service and said guest account;

means for said second service sending said relation identification data to said first service along with said relevant data; and means for said first service storing said relation identification data for future use.

35. The apparatus of claim 29, wherein said access code is formatted as:

<unique IDP code><unique ID inside IDP>.

36. The apparatus of claim 29, wherein if said second service verifies said access code, then said second service and said first service can communicate in any way possible.

37. The apparatus of claim 29, further comprising means for said authentication service providing additional information relevant to said first service.

38. An apparatus for sharing services without sharing identity informational data using pseudonyms, said apparatus comprising:
- a first service associated with a first identity informational data and associated with a first pseudonym;
- a second service associated with a second identity informational data and associated with a second pseudonym, wherein said second service desires to interact with said first service; and
- an authentication mechanism for authenticating said second identity informational data for sharing of said first and second services, wherein at least one of said first service and said second service comprises:
- a Universal Resource Identity (URI).

39. A method for sharing services without sharing identity informational data using pseudonyms, said method comprising the steps of:
- providing a first service associated with a first identity informational data and associated with a first pseudonym;
- providing a second service associated with a second identity informational data and associated with a second pseudonym, wherein said second service desires to interact with said first service; and
- providing an authentication mechanism for authenticating said second identity informational data for sharing of said first and second services, wherein said first identity informational data comprises:
- a Universal Resource Identity (URI).

* * * * *